US006238642B1

(12) United States Patent
Schulz et al.

(10) Patent No.: US 6,238,642 B1
(45) Date of Patent: May 29, 2001

(54) PROCESS OF PREPARING SULFURYL FLUORIDE

(75) Inventors: Alf Schulz, Wedemark; Matthias Rieland; Eckhard Hausmann, both of Hannover, all of (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 09/437,258

(22) Filed: Nov. 10, 1999

(30) Foreign Application Priority Data

Nov. 11, 1998 (DE) ................................ 198 51 999

(51) Int. Cl.⁷ .................................................. C01B 17/45
(52) U.S. Cl. ............................................................. 423/468
(58) Field of Search ..................................... 423/467, 468

(56) References Cited

U.S. PATENT DOCUMENTS 3,320,030   5/1967   Bisignani et al. .
3,623,964 * 11/1971  Ukihashi et al. .
4,003,984   1/1977   Jones et al. .
4,102,987 * 7/1978   Cook et al. .

FOREIGN PATENT DOCUMENTS 1000354   1/1954  (DE) .
2643521   4/1977  (DE) .
1017323 * 1/1966  (GB) .

OTHER PUBLICATIONS

Moissan, H. and Lebeau, P., Ann. Chim. Phys. [7] 26 (1902), pp. 145–178.
"Handbuch der Anorganischen Chemie, Schwefel, Teil B., Lieferung 3" 1963, 8. Auflage, Verlag Chemie, Weinheim XP002130203, p. 1729–p. 1730.
European Search Report dated Feb. 2, 2000.

* cited by examiner

Primary Examiner—Tom Dunn
Assistant Examiner—Christina Ildebrando
(74) Attorney, Agent, or Firm—Evenson, McKeown, Edwards & Lenahan, P.L.L.C.

(57) ABSTRACT

Sulfuryl fluoride is prepared selectively and in a high yield from sulfur dioxide and elemental fluorine in the presence of an alkali fluoride and hydrogen fluoride. The preferred alkali fluoride is potassium fluoride.

7 Claims, No Drawings

PROCESS OF PREPARING SULFURYL FLUORIDE

BACKGROUND OF THE INVENTION

The invention relates to a process for the preparation of sulfuryl fluoride.

Sulfuryl fluoride is used, for example, as a fumigant for insecticidal purposes. It is already known that sulfuryl fluoride can be prepared from sulfur dioxide and fluorine in the gas phase, see H. Moissan and P. Lebeau in Ann. Chim. Phys. [7] 26 (1902), pages 145 to 178, in particular pages 159 to 169. However, this type of preparation is very risky, since explosions may occur.

SUMMARY OF THE INVENTION

It was an object of the present invention to devise a process with which sulfuryl fluoride can be prepared in a high yield and with high purity.

This and other objects have been achieved in accordance with the present invention by providing a process for the preparation of sulfuryl fluoride, the process comprising reacting sulfur dioxide and elemental fluorine in the presence of an alkali fluoride and liquid hydrogen fluoride to form sulfuryl fluoride.

DESCRIPTION OF PREFERRED EMBODIMENTS

The process according to the invention provides for sulfur dioxide and elemental fluorine to be reacted together in the presence of an alkali fluoride and hydrogen fluoride. In this case, the hydrogen fluoride is present in the liquid phase. Preferably the alkali fluoride is present in the form of a solution in hydrogen fluoride. For example, the alkali fluoride may be used dissolved in HF. However, it may also be added as a solid to HF, and for example also as a precursor (e.g. as carbonate). It then dissolves during the reaction until it is dissolved in the HF.

As used herein the term "alkali fluoride" refers to LiF, NaF, KF, CsF and RbF, preferably KF. Of course, the alkali fluoride may also be used as an HF adduct.

The fluorine may be used in pure form or as a mixture with inert gas (e.g. $N_2$, Ar, etc.).

Advantageously, the operating temperature will lie in the temperature range from −60 to +50° C., preferably −10° C. to +20° C. The pressure is preferably in the range from ambient pressure (about 1 bar absolute) to 10 bar (absolute).

The molar ratio of $SO_2$ to $F_2$ is advantageously in the range from 0.9:1 to 1.1:1. The alkali fluoride is preferably present dissolved in the reaction mixture in a quantity of 1 to 20% by weight. The hydrogen fluoride may be used in a stoichiometric excess; it functions as a solvent for the alkali fluoride.

In order to work up the reaction mixture, it is possible, for example, to condense out excess HF from the reaction mixture which is removed in gaseous form. The reaction mixture which has not condensed out is then washed, e.g. with water containing hydrogen peroxide. The remaining pure $SO_2F_2$ is then dried, compressed and poured into steel flasks.

The process according to the invention may, for example, be performed as a batch reaction. Alternatively, it is also possible to operate continuously, for example by circulating part of the reaction mixture and isolating resulting sulfuryl fluoride therefrom (as described under "work-up"). Hydrogen fluoride which condenses out is recycled.

The process according to the invention has the advantage that it is very selective—hardly any secondary reactions take place. The reaction takes place rapidly and completely, and at low temperatures.

The following examples are intended to illustrate the invention in further detail, without restricting its scope.

EXAMPLE 1

Preparation of Sulfuryl Fluoride/Two-stage Addition of Fluorine $$SO_2 + F_2 \rightarrow SO_2F_2$$

Batch

| | |
|---|---|
| HF | 64 g |
| KF | 10 g (0.17 mole) |
| $SO_2$ | 11 g (0.17 mole) |
| $F_2$ | 3.8 l (0.17 mole) |

Procedure

KF was placed in a 300 ml autoclave, and HF was metered in with ice cooling. Thereupon, strong evolution of heat was observed, and the temperature in the autoclave rose from 2° C. to 24° C.

After cooling to 0° C., the addition of $SO_2$ took place. No evolution of heat could be detected. Then $F_2$ was metered in up to a pressure of 6 bar (corresponding to one-half of the stoichiometric quantity). Then the reaction mixture was brought to 21° C. (pressure 6 bar).

In an oil bath, the reaction mixture was heated to 40° C. No pressure increase was recorded. Then the reaction mixture was cooled with dry ice (at −59° C., the pressure was approximately 2 bar), and $F_2$ was again fed in up to a pressure of 7 bar. The cold bath was removed, and at 23° C. the pressure in the autoclave was 7 bar. The contents of the autoclave were again heated to 40° C. (no increase in pressure). Then they were cooled to −76° C. The pressure was then 1 bar.

The pressure in the autoclave was brought to 5 bar with $N_2$ 10 times and purged.

At 22° C., the pressure was 5 bar. The reaction gas was passed through KI solution. Lack of discoloration indicated that no fluorine was present.

The reaction mixture was investigated using gas chromatography (GC/MS).

Result

| Total Peak Area 1294930 | | | |
|---|---|---|---|
| Retention Time | Peak Area | Peak Area % | Substance Name |
| 3.19 | 561350 | 43.383 | Air |
| 3.31 | 15766 | 1.219 | $SF_6$ |
| 3.42 | 48575 | 3.754 | $CO_2$ |
| 3.51 | 644997 | 49.848 | $SO_2F_2$ |
| 3.75 | 8716 | 0.674 | $SOF_2$ |
| 3.91 | 2265 | 0.175 | — |
| 4.05 | 91 | 0.007 | — |
| 4.76 | 9267 | 0.716 | $SO_2$ |
| 10.74 | 1837 | 0.142 | CFC-113 |
| 13.58 | 1066 | 0.082 | — |

EXAMPLE 2
Preparation of Sulfuryl Fluoride/single-stage Addition of Fluorine

Batch

| | |
|---|---|
| HF | 50 g |
| KF | 5 g (0.08 mole) |
| $SO_2$ | 6 g (0.09 mole) |
| $F_2$ | 1.9 l (0.09 mole) |

Procedure

HF, KF and $SO_2$ were initially introduced. Once 6 bar $F_2$ had been metered in, slight evolution of heat observed, and the temperature of the reaction mixture rose from 2° C. to 7° C.

After one hour, the pressure had dropped to 2.5 bar (at 20° C. 2.8 bar). A gas sample over dry KI showed no discoloration (no $F_2$).

Then the gas was passed through a washing bottle with aqueous KF solution in the gas collection tube and GC/MS measurements were recorded.

Result

| Total Peak Area 1119065 | | | |
|---|---|---|---|
| Retention Time | Peak Area | Peak Area % | Substance Name |
| 3.17 | 653122 | 58.363 | Air |
| 3.29 | 2603 | 0.233 | $SF_6$ |
| 3.41 | 3577 | 0.320 | $CO_2$ |
| 3.49 | 453955 | 40.566 | $SO_2F_2$ |
| 3.74 | 5770 | 0.516 | — |
| 3.91 | 38 | 0.003 | — |

EXAMPLE 3
Preparation of Sulfuryl Fluoride with LiF

Batch

| | |
|---|---|
| HF | 55 g |
| LiF | 2.6 g (0.1 mole) |
| $SO_2$ | 10 g (0.1 mole) |
| $F_2$ | 1.9 l (0.1 mole) |

Procedure

LiF was placed in the autoclave, and HF, $SO_2$ and fluorine (7 bar) were added with ice cooling. The reaction mixture was allowed to stand overnight, and then was kept for 1 hour at 40° C. The reaction mixture was filled 10 times with 5 bar nitrogen each time and purged. The remaining reaction mixture was investigated by gas chromatography.

Result

| Total Peak Area 1446847 | | | |
|---|---|---|---|
| Retention Time | Peak Area | Peak Area % | Substance Name |
| 3.17 | 603814 | 41.733 | Air |
| 3.29 | 1330 | 0.092 | $SF_6$ |
| 3.41 | 9602 | 0.664 | $CO_2$ |
| 3.48 | 809773 | 55.968 | $SO_2F_2$ |
| 3.73 | 3404 | 0.235 | $SOF_2$ |
| 3.88 | 11 | 0.011 | — |
| 3.92 | 7 | 0.001 | — |
| 4.04 | 412 | 0.029 | — |
| 4.59 | 16895 | 1.168 | $H_2O$ |
| 4.75 | 1599 | 0.111 | $SO_2$ |

Comparison Example
Preparation of Sulfuryl Fluoride without Alkali Fluoride

Reaction

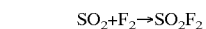

$$SO_2 + F_2 \rightarrow SO_2F_2$$

Batch

| | |
|---|---|
| HF | 58 g |
| $SO_2$ | 8 g (0.09 mole) |
| $F_2$ | 3 l (0.08 mole) |

Procedure

HF and $SO_2$ were placed in the autoclave with ice cooling, and fluorine was added (7 bar). The reaction mixture was allowed to stand overnight and then, once it had been passed through aqueous KF, was investigated by gas chromatography. The gas chromatography demonstrated a high content of $SOF_2$.

Result

| Total Peak Area 1058218 | | | |
|---|---|---|---|
| Retention Time | Peak Area | Peak Area % | Substance Name |
| 3.17 | 631714 | 59.696 | Air |
| 3.29 | 1165 | 0.110 | $SF_6$ |
| 3.41 | 3243 | 0.307 | $CO_2$ |
| 3.50 | 391816 | 37.026 | $SO_2F_2$ |
| 3.74 | 29889 | 2.824 | $SOF_2$ |
| 4.75 | 92 | 0.009 | $SO_2$ |
| 6.88 | 299 | 0.028 | — |

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A process for the preparation of sulfuryl fluoride, said process comprising reacting sulfur dioxide and elemental fluorine in the presence of an alkali fluoride and liquid hydrogen fluoride to form sulfuryl fluoride.

2. A process according to claim 1, wherein the reaction is carried out at a temperature in the range from −60 to +50° C.

3. A process according to claim 1, wherein the alkali fluoride is used dissolved in hydrogen fluoride.

4. A process according to claim 3, wherein the reaction is carried out at a temperature in the range from −60 to +50° C.

5. A process according to claim 1, wherein a mixture of alkali fluoride, hydrogen fluoride and sulfur dioxide is initially produced, and elemental fluorine is thereafter introduced into the mixture.

6. A process according to claim 1, wherein the alkali fluoride is potassium fluoride.

7. A process according to claim 1, wherein the process is performed continuously, and further wherein the sulfur dioxide, elemental fluorine, alkali fluoride, and liquid hydrogen fluoride form a reaction mixture, and a part of the reaction mixture is recirculated.

* * * * *